United States Patent
Uno et al.

(10) Patent No.: US 12,161,937 B2
(45) Date of Patent: Dec. 10, 2024

(54) INFORMATION PROCESSING DEVICE AND VIDEO EDITING METHOD

(71) Applicant: SONY INTERACTIVE ENTERTAINMENT INC., Tokyo (JP)

(72) Inventors: Masayuki Uno, Tokyo (JP); Masanao Nishikido, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 118 days.

(21) Appl. No.: 17/642,907

(22) PCT Filed: Sep. 28, 2020

(86) PCT No.: PCT/JP2020/036710
§ 371 (c)(1),
(2) Date: Mar. 14, 2022

(87) PCT Pub. No.: WO2021/075250
PCT Pub. Date: Apr. 22, 2021

(65) Prior Publication Data
US 2022/0362676 A1    Nov. 17, 2022

(30) Foreign Application Priority Data

Oct. 17, 2019  (JP) .................................. 2019-190247

(51) Int. Cl.
*A63F 13/69*    (2014.01)
*A63F 13/60*    (2014.01)
(Continued)

(52) U.S. Cl.
CPC .............. *A63F 13/69* (2014.09); *A63F 13/60* (2014.09); *A63F 13/86* (2014.09); *G11B 27/02* (2013.01);
(Continued)

(58) Field of Classification Search
None
See application file for complete search history.

(56) References Cited

U.S. PATENT DOCUMENTS

| 10,984,361 B1* | 4/2021 | Shook ..................... A63F 13/79 |
| 2007/0060389 A1* | 3/2007 | Shimizu .................. A63F 13/48 463/43 |

(Continued)

FOREIGN PATENT DOCUMENTS

| JP | 2003-109025 A | 4/2003 |
| JP | 2007-313001 A | 12/2007 |

(Continued)

OTHER PUBLICATIONS

International Search Report and Written Opinion mailed Nov. 10, 2020, from PCT/JP2020/036710, 11 sheets.

(Continued)

*Primary Examiner* — Jason T Yen
(74) *Attorney, Agent, or Firm* — XSENSUS LLP

(57) ABSTRACT

A ring buffer 136 records a game video provided by a running game software 110 together with time information. When an unlock condition of a trophy that is a virtual award is satisfied, a trophy processing section 124 gives a trophy to a user playing a game. A video acquiring section 140 reads, from the ring buffer 136, the video including the game image that is at a time when the unlock condition becomes satisfied, and records the video in a second recording section 160. A video processing section 152 carries out an editing process on the video recorded in the second recording section 160.

10 Claims, 8 Drawing Sheets

(51) Int. Cl.
  *A63F 13/86* (2014.01)
  *G11B 27/02* (2006.01)
  *A63F 13/79* (2014.01)
(52) U.S. Cl.
  CPC ......... *A63F 13/79* (2014.09); *A63F 2300/577* (2013.01); *A63F 2300/609* (2013.01)

(56) References Cited

U.S. PATENT DOCUMENTS

| | | | |
|---|---|---|---|
| 2009/0131177 A1 | 5/2009 | Pearce | |
| 2014/0187334 A1 | 7/2014 | Crossley | |
| 2015/0065236 A1* | 3/2015 | Hayashida | A63F 13/63 463/29 |
| 2015/0141140 A1* | 5/2015 | Lampe | G11B 27/031 463/31 |
| 2015/0224395 A1* | 8/2015 | Trombetta | A63F 13/497 463/24 |
| 2016/0008716 A1 | 1/2016 | Perlman et al. | |
| 2016/0214012 A1* | 7/2016 | Nishikawa | A63F 13/497 |
| 2016/0292881 A1* | 10/2016 | Bose | G11B 27/10 |
| 2018/0001216 A1* | 1/2018 | Bruzzo | A63F 13/48 |
| 2019/0065526 A1* | 2/2019 | Ribeiro | G06F 16/183 |
| 2020/0384369 A1* | 12/2020 | Holmes | A63F 13/355 |

FOREIGN PATENT DOCUMENTS

| | | | |
|---|---|---|---|
| JP | 2010-035763 A | 2/2010 | |
| JP | 2014-092991 A | 5/2014 | |
| JP | 2015-051082 A | 3/2015 | |
| JP | 2015-198404 A | 11/2015 | |
| JP | 2016-097089 A | 5/2016 | |
| JP | 2016-116196 A | 6/2016 | |
| JP | 2016-189802 A | 11/2016 | |
| JP | 2018-000715 A | 1/2018 | |
| WO | 2013/011246 A1 | 1/2013 | |
| WO | 2015125815 A1 | 8/2015 | |
| WO | 2016/067734 A1 | 5/2016 | |

OTHER PUBLICATIONS

"SHARE 昨日を使おう"Ap「プレイステーション4で始める a ファイナルファンタジーXIV:新生エオ, tion), non-official translation ("Let's use SHARE function", Start with PlayStation 4, Final Fantasy XIV: A Realm Reborn [basic edition], Weekly Famitsu No. 2014.04.24 Special Appendix"), 4 sheets.

Office Action issued Nov. 7, 2023 in Japanese Patent Application No. 2022-180155, 6 pages.

Kentaro Kon, a technique for editing animation practiced by a person who has played a game, and a technique for playing a game by a beginner in the course of playing a game, and [02, 2006.01, 27] online], 2019 Search on Feb. 13, Internet< URL: https://w.atwiki.jp/live2ch/pages/576.html >.

Okayasu [ Study and "Game On-the-spot Animation ] It is ? in order to edit.—How to use free editing software", [June [ online], 2015 year ] 19 and morning-sun interactive incorporated company and CNET Japan, [2024 year Feb. 13 search], Internet< URL: https://japan.cnet.com/article/35066063 />.

Japanese Office Action issued Feb. 20, 2024 in corresponding Japanese Patent Application No. 2022-180155, 6 pages.

* cited by examiner

FIG.4

| stats ID | NAME | VALUE |
|---|---|---|
| 1 | GREETING | 99 |
| 2 | DEFEAT ENEMY | 28 |
| 3 | EXPERIENCE POINT | 95287 |
| ... | ... | ... |

(a) VIDEO FOR 30 SECONDS — START POSITION → END POSITION (b) VIDEO FOR 15 SECONDS — START POSITION → END POSITION t

TIMING WHEN UNLOCK CONDITION BECOMES SATISFIED (a)

(b)

(a)

(b)

INFORMATION PROCESSING DEVICE AND VIDEO EDITING METHOD

TECHNICAL FIELD

The present invention relates to a technique for recording a game video.

BACKGROUND ART

When a user completes various missions in a game, a virtual award corresponding to the mission is given to the user. In PTL 1, the virtual award is called a "trophy," and a bronze, silver, or gold trophy is given to the user according to the difficulty of the mission. PTL 1 discloses a game system that notifies a trophy management utility of the trophy ID (Identification) corresponding to the mission when game software determines that the user has cleared the mission.

PTL 2 discloses an information processing device including a recording section that records video data made by running game software, a metadata acquiring section that acquires metadata indicating an execution state of the game software, and a content generating section that extracts, as content data, game video data from a start point to an end point of game video data recorded in the recording section.

CITATION LIST

Patent Literature

[PTL 1]
JP 2016-97089 A
[PTL 2]
JP 2015-198404 A

SUMMARY

Technical Problem

The trophy acquisition status is an index for evaluating the achievement degree of game, and the user is motivated to play the game by competing with friends for the number of acquired trophies. If the attractiveness of acquiring the trophy itself can be enhanced, it is considered that the motivation to play the game can be further enhanced.

Therefore, an object of the present invention is to achieve a system for enhancing the attractiveness of acquiring trophies for a user.

Solution to Problem

In order to solve the above problem, an information processing device of one aspect of the present invention is provided with a first recording section that records a game video provided by game software that is running, together with time information, an award processing section that gives a virtual award to a user who is playing a game when an unlock condition of the virtual award is satisfied, a video acquiring section that reads a video including a game image when the unlock condition becomes satisfied from the first recording section and records the video in a second recording section, and a video processing section that performs editing processing on the video recorded in the second recording section.

A video editing method of another aspect of the present invention is provided with a step of recording a game video provided by game software that is running in a first recording section together with time information, a step of giving a virtual award to a user who is playing a game when an unlock condition of the virtual award is satisfied, a step of recording a video including a game image when the unlock condition becomes satisfied in a second recording section by reading the video from the first recording section, and a step of performing editing processing on the video recorded in the second recording section.

It should be noted that any combination of the above components and the conversion of expression of the present invention between methods, devices, systems, recording media, computer programs and the like are also effective as aspects of the present invention.

BRIEF DESCRIPTION OF DRAWINGS

FIG. 4 is a diagram illustrating an example of a statistical table.

FIG. 5 depicts diagrams conceptually illustrating videos.

DESCRIPTION OF EMBODIMENT

First, the outline of the present invention will be described. In the information processing system of the embodiment, the user runs game software (console game) installed in an information processing device to play the game. When an event occurs in the game, the game software outputs event information including an event code that identifies the event that has occurred to the system software. The event occurs when there is a change in the progress of the game play or when there is a change in the behavior of a player character or a game character. The system software sends the output event information to an external server, and the server collects the event information sent from a plurality of information processing devices to use the information to analyze the user's play trends for a specific game or to improve the game scenario.

Various missions are set in the game, and when the mission is cleared, a virtual award (trophy) corresponding to the mission is given to the user. Since the mission clearing condition is a play condition that releases the trophy to the user, the condition will be referred to as an "unlock condition" of the trophy hereinafter. At least some of a plurality of types of events are related to the trophy unlock condition. Although the game software determines the establishment of unlock condition of the trophy in the game system described in PTL 1, the game software outputs the event information and the system software determines the establishment of unlock condition of the trophy in the information processing system of the embodiment.

For the purpose of increasing the attractiveness of acquiring a trophy, the system software acquires a video taken when the user acquires the trophy, and carries out editing processing to demonstrate that the video is one related to the acquired trophy. This allows users to view the edited video or easily upload the video to a video sharing site, and increases their motivation for acquiring trophies, thereby increasing their motivation for game play.

Figure 1:
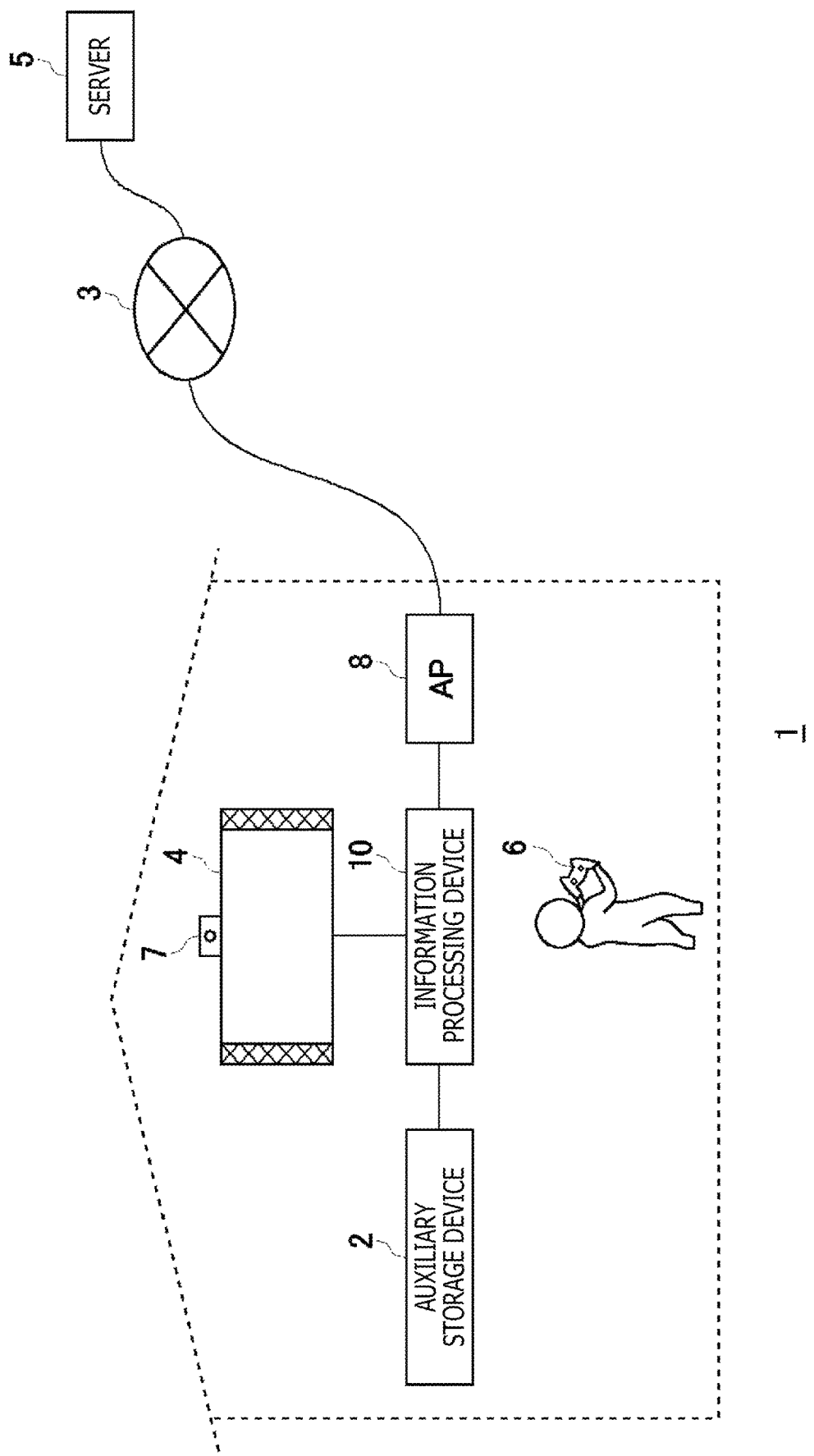
FIG. 1 is a diagram illustrating an information processing system according to an embodiment.

FIG. 1 illustrates an information processing system 1 according to an embodiment of the present invention. The information processing system 1 may be a game system including an information processing device 10 which is a user terminal device and a server 5. An access point (hereinafter referred to as an "AP") 8 has the functions of a wireless access point and a router, and the information processing device 10 connects to the AP 8 via wireless or wired communication and connects to the server 5 on a network 3 communicably.

The information processing device 10 is wirelessly or wiredly connected to an input device 6 operated by the user, and the input device 6 outputs the information regarding operation by the user to the information processing device 10. When receiving the operation information from the input device 6, the information processing device 10 reflects the information in the processing of the system software or the game software, and causes an output device 4 to output the processing result. In the information processing system 1, the information processing device 10 may be a game device (game console) that executes a game, and the input device 6 may be a device such as a game controller that supplies user's operation information to the information processing device 10. Incidentally, the input device 6 may be an input interface such as a keyboard or a mouse.

An auxiliary storage device 2 is a large-capacity storage device such as an HDD (Hard Disk Drive) or SSD (Solid State Drive), may be a built-in storage device, and may be an external storage device connected to the information processing device 10 by a USB (Universal Serial Bus) or the like. The output device 4 may be a television having a display for outputting an image and a speaker for outputting audio. The output device 4 may be connected to the information processing device 10 with a cable, or may be wirelessly connected thereto.

A camera 7, which is an imaging device, is provided in the vicinity of the output device 4 and captures images of the space around the output device 4. Although FIG. 1 illustrates an example in which the camera 7 is attached to the upper part of the output device 4, the camera may be arranged on the side or the lower part of the output device 4, and in any case, is located at a position so as to be capable of capturing images of the user being in front of the output device 4. The camera 7 may be a stereo camera.

The server 5 provides a network service to the user of the information processing system 1. The server 5 manages a network account that identifies each user, and each user signs in to a network service provided by the server 5 by using the network account. By signing in to the network service from the information processing device 10, the user can register in the server 5 the save data of the game or the trophy, which is a virtual award acquired during the game play. By registering the save data and the trophy in the server 5, the save data and the trophy can be synchronized even if the user uses an information processing device different from the information processing device 10.

The server 5 of the embodiment may collect event information generated during game play from the information processing device 10. The server 5 can analyze the user's play trend from the event information, and therefore can acquire information regarding how multiple users play for each game scene. Such information can be used as help information for the player who has entered the scene, and the server 5 can fulfill an effective help function in response to a request from the user. The server 5 can discover the potential needs of the user from the play trend of the user, and can provide useful feedback to the game developer.

Figure 2:
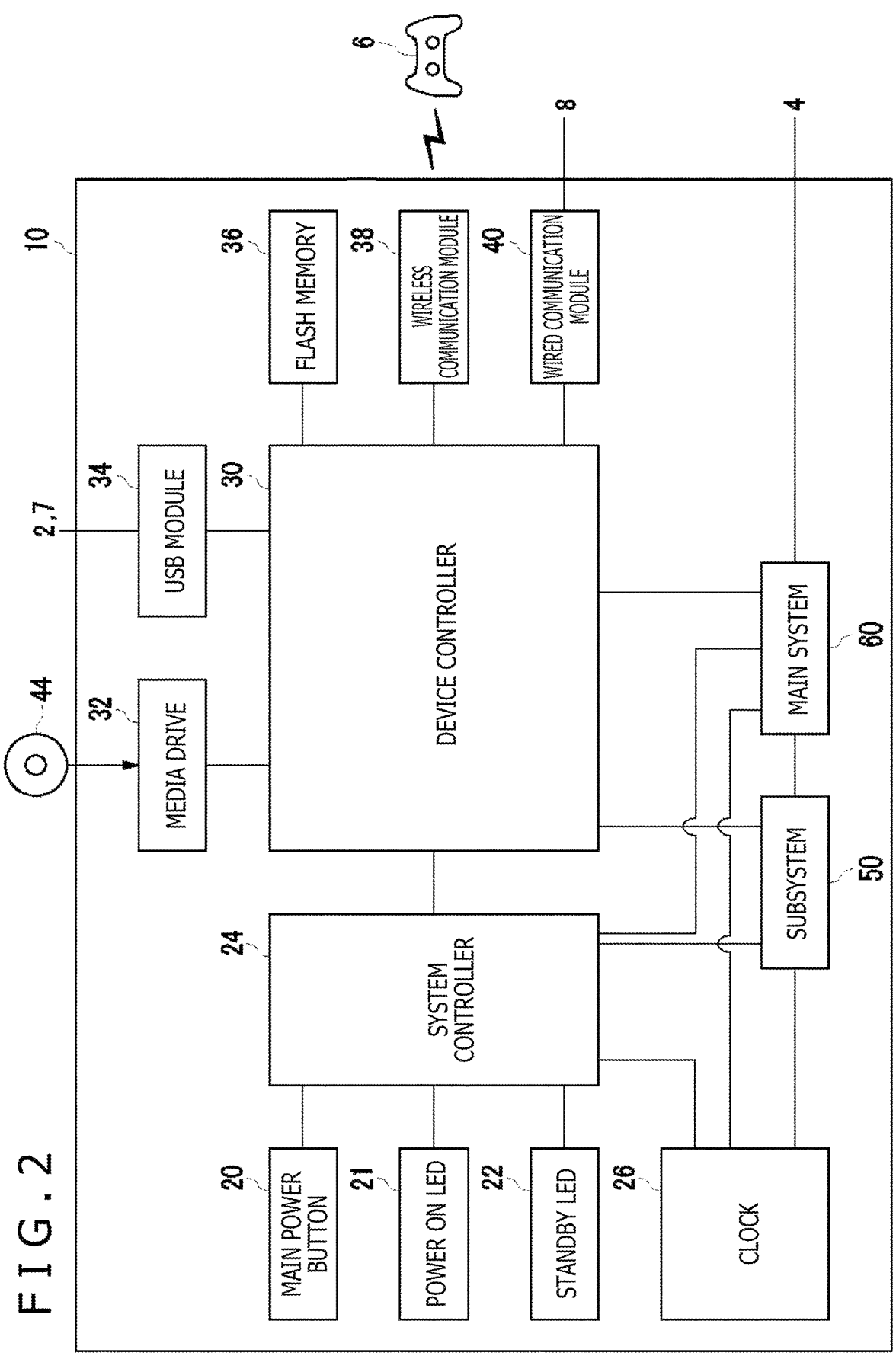
FIG. 2 is a diagram illustrating a hardware configuration of an information processing device.

FIG. 2 illustrates the hardware configuration of the information processing device 10. The information processing device 10 includes a main power button 20, a power ON LED (Light-Emitting Diode) 21, a standby LED 22, system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory and a memory controller which are main storage devices, a GPU (Graphics Processing Unit), and the like. The GPU is mainly used for arithmetic processing of a game program. The main CPU has a function of starting the system software and executing the game program installed in the auxiliary storage device 2 under an environment provided by the system software. The subsystem 50 includes a sub CPU, a memory and a memory controller as main storage devices, and the like, and does not include a GPU.

The main CPU has a function of executing a game program installed in the auxiliary storage device 2 or a ROM (Read-Only Memory) medium 44, whereas the sub CPU does not have such a function. However, the sub CPU has a function of accessing the auxiliary storage device 2 and a function of transmitting and receiving data to and from the server 5. The sub CPU is configured to have only such a limited processing function, and therefore can operate with a small power consumption as compared with the main CPU. These functions of the sub CPU are executed when the main CPU is in the standby state.

The main power button 20 is an input unit for inputting operations from the user, and is provided on the front surface of housing of the information processing device 10 to be operated to turn on or off the power supply to the main system 60 of the information processing device 10. The power ON LED 21 lights up when the main power button 20 is turned on, and the standby LED 22 lights up when the main power button 20 is turned off. The system controller 24 detects the user's pressing of the main power button 20.

The clock 26 is a real-time clock that generates current date and time information and supplies the information to the system controller 24, the subsystem 50, and the main system 60.

The device controller 30 is configured as an LSI (Large-Scale Integrated Circuit) that executes information transfer between devices like a south bridge. As illustrated in the figure, devices such as the system controller 24, media drive 32, USB module 34, flash memory 36, wireless communication module 38, wired communication module 40, subsystem 50, and main system 60 are connected to the device controller 30. The device controller 30 absorbs the difference in electrical characteristics and the difference in the data transfer speeds of respective devices, and controls a timing of data transfer.

The media drive 32 is a drive device that is equipped with and drives the ROM medium 44 in which application software of a game or the like, and license information are recorded, and reads a program, data, or the like from the ROM medium 44. The ROM medium 44 is a read-only recording medium such as an optical disc, a magneto-optical disc, or a Blu-ray disc.

The USB module 34 is a module that connects to an external device with a USB cable. The USB module 34 may be connected to the auxiliary storage device 2 and the camera 7 with USB cables. The flash memory 36 is an auxiliary storage device that constitutes an internal storage. The wireless communication module 38 wirelessly communicate with the input device 6, for example, by using a communication protocol such as a Bluetooth (registered trademark) protocol or an IEEE (Institute of Electrical and Electronic Engineers) 802.11 protocol. The wired communication module 40 communicates with an external device by wire and connects to the network 3 via the AP 8, for example.

Figure 3:
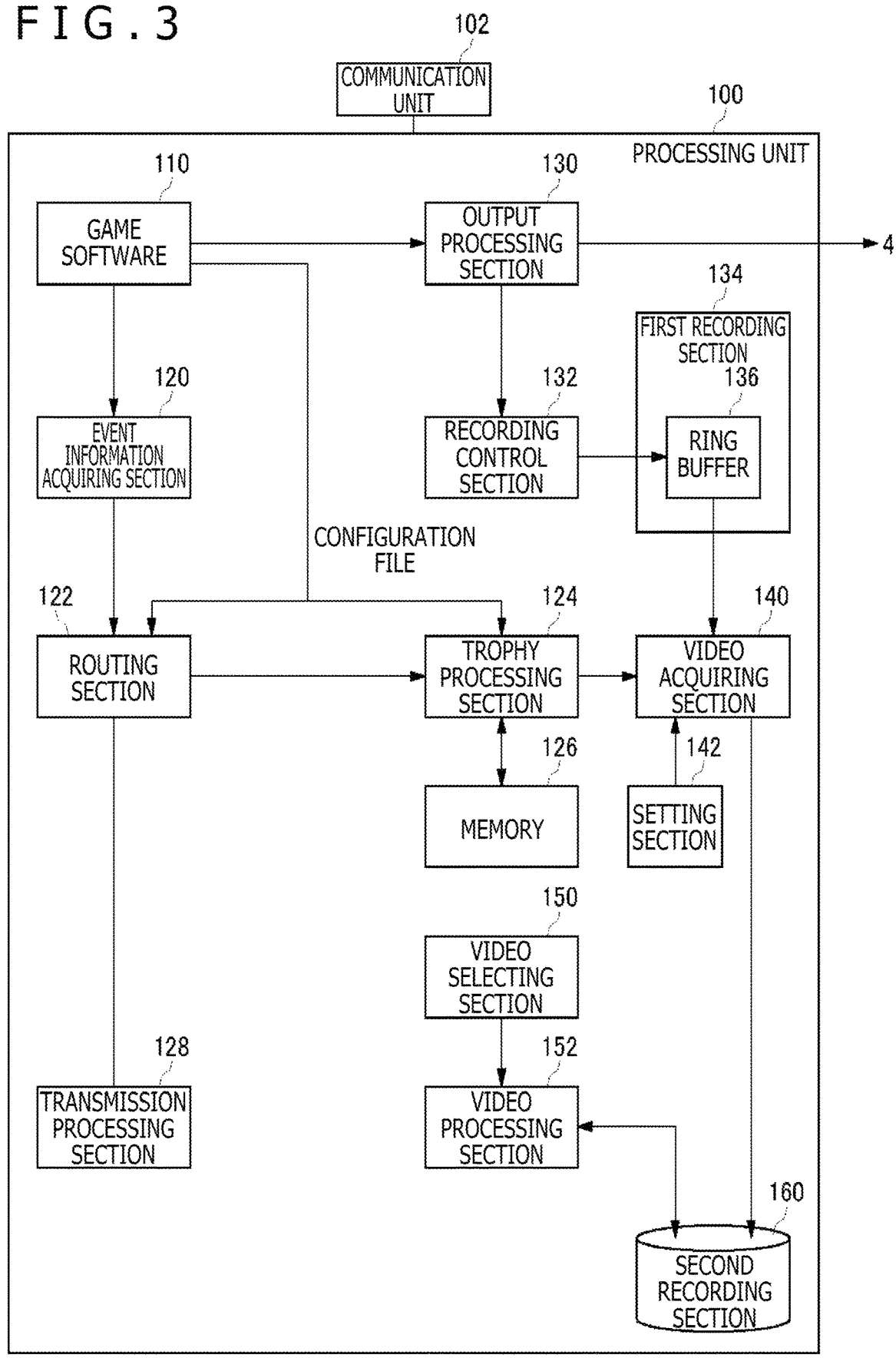
FIG. 3 is a diagram illustrating functional blocks of the information processing device.

FIG. 3 illustrates functional blocks of the information processing device 10. The information processing device 10 includes a processing unit 100 and a communication unit 102. The processing unit 100 includes game software 110, an event information acquiring section 120, a routing section 122, a trophy processing section 124, a memory 126, a transmission processing section 128, an output processing section 130, a recording control section 132, a first recording section 134, a video acquiring section 140, a setting section 142, a video selecting section 150, a video processing section 152, and a second recording section 160. The communication unit 102 is represented as a configuration having both the functions of the wireless communication module 38 and the wired communication module 40 illustrated in FIG. 2, and the wireless communication module 38 is in charge of communication with the input device 6, and the wired communication module 40 is in charge of communication with the server 5.

In FIG. 3, each of elements described as functional blocks that perform various processes can have a circuit block, a memory, or other LSIs in terms of hardware, and is achieved by a program or the like loaded into the memory in terms of software. Therefore, it is understood by those skilled in the art that these functional blocks can be implemented in various forms by hardware only, by software only, or by a combination of hardware and software, and the functional blocks are not limited to any of these.

The game software 110 includes at least a game program, image data, audio data, and a configuration file. The game program receives the operation information made by the user on the input device 6 and performs arithmetic processing for moving the player character in the virtual space. The output processing section 130 generates image data and audio data of the game and causes the output device 4 to output the data. The output processing section 130 may include a GPU (Graphics Processing Unit) that executes rendering processing and the like.

In the information processing device 10 of the embodiment, the output processing section 130 generates image data and audio data of the game by the running game software 110, and causes the output device 4 to output the data, and in addition, supplies the data also to the recording control section 132. Hereinafter, the image data and the audio data of the game are collectively referred to as "game video" or "game video data." The information processing device 10 has a function of recording a game video generated by the output processing section 130 in the background, and the recording control section 132 records the game video data in the first recording section 134 together with time information (time stamp). In the embodiment, the first recording section 134 may be configured as a ring buffer 136.

The ring buffer 136 is generated by setting the start address and the end address of the recording area of the auxiliary storage device 2. This ring buffer area may be preset at the time of shipment of the information processing device 10. The recording control section 132 records, in the ring buffer 136, the game video generated in the output processing section 130 by the running game software, together with the time stamp.

The recording control section 132 records image data in the ring buffer 136 in the order of predetermined addresses from a start address, and returns to the start address to overwrite and record the image data when recording up to the end address, thereby repeating these processes. For example, the ring buffer 136 is set to record a 20-minute game video, and the recorded game video is time-stamped. By performing background recording of the game video in the ring buffer 136, the user can cut out a desired range from the play video up to 20 minutes ago and upload the video to a video sharing site that distributes the video, for example.

In the embodiment, when an event having been set occurs during the progress of the game, the game program generates event information including an event code that identifies the event that has occurred, and outputs the event information to the event information acquiring section 120 configured by the system software. The game developer may put various events into the game as follows.

If a task, goal, action, and the like that can be executed by a player in a game is called an "activity," when the player starts the activity, an event indicating that the activity has started is generated, and when the player finishes the activity, an event indicating that the activity has ended is generated. For example, in a "battle" activity with an enemy character, a battle start event is generated when the player starts a battle, and a battle end event is generated when the player ends the battle.

When the player carries out an activity related to an action, an event indicating that the activity has been carried out is generated. For example, in a battle activity, in a case where an enemy character is defeated, an event indicating that the enemy character has been defeated is generated. In addition, in the case of greeting a villager in a moving activity of moving around in a village, an event indicating that a villager has been greeted is generated. An event code is assigned to each event, and the game program generates event information in which game data indicating the state of the game at the time of event occurrence is added to the event code for identifying the event that has occurred.

The game program may allow the game data to include information such as the place where the event occurred and information regarding the relevant other person. For example, with respect to an activity in which a player greets villagers, the game data may include at least information indicating the greeting places and the greeted villagers. Further, regarding the activity of defeating an enemy, the game data may include information regarding the defeated enemy characters and the experience points of the player which increase due to the defeat.

During game play, when a player obtains a weapon, an event occurs indicating that the weapon has been obtained. When the player uses a weapon, an event occurs indicating that the weapon has been used, and when an enemy character uses a weapon against the player, an event occurs indicating that a weapon is used against the player. The game program adds game data regarding the type of weapon, the place where the weapon was obtained or used, or the like to the event code to generate event information, and outputs the event information to the event information acquiring section 120. Game developers may define various events and incorporate the events into the game.

Various missions are set in the game for the purpose of increasing user's motivation. When the user clears the mission, a virtual award (trophy) corresponding to the mission is given to the user. The conditions for unlocking a trophy (namely, the conditions for the user for acquiring a trophy by completing a mission) are associated with a particular event. For example, in a case where a mission of "greeting ten villagers" for a bronze trophy is set, the player is provided with the bronze trophy by greeting ten villagers. Also, in a case where a mission of "greeting 100 villagers" for a silver trophy is set, the player is provided with the silver trophy by greeting 100 villagers, and in a case where the mission of "greeting 500 villagers" for a gold trophy is set, the player is provided with the gold trophy by greeting 500 villagers. The determination of establishment of the trophy unlock condition is carried out by the trophy processing section 124, which is an award processing section.

The configuration file included in the game software 110 describes the correspondence between the event information output from the game and the conditions for unlocking the trophy. For example, the configuration file describes information that it is the unlock condition of the bronze trophy that the event code indicating the execution of the greeting activity is output ten times from the game software 110. Similarly, the configuration file describes information that it is the unlock condition of the silver trophy that the event code indicating the execution of the greeting activity is output 100 times, and it is the unlock condition of the gold trophy that the event code indicating the greeting activity is output 500 times.

The configuration file describes information for generating a record that manages the progress of the trophy-unlock condition. Hereinafter, the record for trophy management is referred to as a "statistical record." Statistical records are generated in the memory 126 to record calculated values related to event information involved in the trophy-unlock condition. In a case where the number of occurrences of the greeting activity is the unlock condition of each of the bronze trophy, silver trophy, and gold trophy as described above, in order to manage the progress of the unlock condition of the trophies, the memory 126 is provided with a record for counting the number of occurrences of the greeting activity.

When being supplied with the configuration file by the game software 110, the trophy processing section 124 generates a record for trophy management in the memory 126.

FIG. 4 illustrates an example of a statistical table generated in the memory 126. Various records related to the trophy-unlock condition are formed in the statistical table. FIG. 4 illustrates a state in which the value of each record has already been input.

The record value of the "greeting" indicated by the stats ID "1" exhibits the number of times the event code of the greeting activity has been output. As mentioned above, the number of greeting activities constitutes the unlock condition of the bronze trophy, silver trophy, and gold trophy. When the event code of the greeting activity is output from the game software 110, the trophy processing section 124 increments the record value of the stats ID "1" by 1.

The record value of the "defeat enemy" indicated by the stats ID "2" exhibits the number of times the event code of the activity of defeating the enemy is output. In this example, defeating a predetermined number of enemy characters is set as a trophy acquisition mission, and when the event code of the activity of defeating the enemy is output from the game software 110, the trophy processing section 124 increments the record value of the stats ID "2" by 1.

The record value of the "experience point" indicated by the stats ID "3" exhibits the summing value of the experience points included in the game data attached to the event code. In this example, reaching predetermined experience points is set as a trophy acquisition mission, and the trophy processing section 124 adds the experience points included in the game data to the record value of the stats ID "3" to update the value.

The configuration file of the game software 110 includes a list of event codes related to unlock of the trophy, and the code list is provided to the routing section 122 and the trophy processing section 124 before the start of game play. When acquiring the event information from the game software 110, the event information acquiring section 120 adds date and time information (time stamp) to the acquired event information and passes the information to the routing section 122. It should be noted that the date and time information may be added by the game software 110 when the event information is generated by the game software 110. When being supplied with the event information, the routing section 122 provides all the event information to the transmission processing section 128, and provides the event information related to the unlocking of the trophy to the trophy processing section 124 in accordance with the code list included in the configuration file.

The trophy processing section 124 updates the record corresponding to the event information on the basis of the correspondence relation between the event information and the record included in the configuration file. As described above, when acquiring the event code of the greeting activity, the trophy processing section 124 increments the record count value of the corresponding stats ID "1" by 1 for updating.

As described above, the trophy processing section 124 of the embodiment updates the count value of the record included in the trophy management statistical table in accordance with the acquired event information. The trophy processing section 124 determines whether the trophy unlock condition is satisfied, based on the record values recorded in the statistical table.

When the record value satisfies the unlock condition of the trophy, the trophy processing section 124 assigns the corresponding trophy to the user who is playing the game. The information regarding the given trophy is registered in the trophy processing section 124 and transmitted to the server 5 as well. For example, when the record value of the stats ID "1" reaches 10, the trophy processing section 124 determines that the bronze trophy has been unlocked and assigns the bronze trophy to the user. The record value of the stats ID "1" is continuously monitored by the trophy processing section 124, and when the record value reaches 100, the trophy processing section 124 determines that the silver trophy has been unlocked, and when the number reaches 500, the trophy processing section 124 determines that the gold trophy has been unlocked.

When determining that the unlock condition of the trophy is satisfied, the trophy processing section 124 may superimpose and display the notification information indicating that the user has acquired a trophy on the game image during the play. This allows the user to know the acquisition of the trophy.

Note that the routing section 122 supplies all event information to the transmission processing section 128, and the transmission processing section 128 causes the communication unit 102 to transmit the supplied event information to the server 5. Therefore, the server 5 collects all event information generated during game play.

The trophy processing section 124 generates a statistical table for trophy management in the memory 126, and manages the progress of the trophy unlock condition in accordance with the value of each record. Therefore, the trophy processing section 124 may display a progress bar indicating the progress status regarding the achievement of the unlock condition of the trophy for which the unlock condition is not satisfied. This allows the user to check information regarding the play required to acquire the trophy. Incidentally, the trophy processing section 124 may display the progress status by text regarding the greeting activity to the villagers, such as the text message "If you greet one more person, you can get the silver trophy," for example.

In the information processing device 10 of the embodiment, the trophy processing section 124 gives the user a trophy when the unlock condition of the virtual award is satisfied, and at this time, notifies the video acquiring section 140 of the unlock information indicating that the unlock condition is satisfied. The unlock information may include time information indicating when the unlock condition became satisfied and metadata of the trophy to be unlocked. When being notified of the unlock information, the video acquiring section 140 reads the video including the game image at the time when the unlock condition becomes satisfied from the ring buffer 136, and associates the read video with the time information regarding when the unlock condition became satisfied and the trophy metadata to record the video in the second recording section 160.

The user can set the length of the video to be recorded in the second recording section 160. For example, the length of the video may be set to either 15 seconds or 30 seconds by the user. The setting section 142 sets the length of the video read by the video acquiring section 140 on the basis of the instruction from the user. The video acquiring section 140 reads a video having the length set by the setting section 142 from the ring buffer 136 and records the video in the second recording section 160.

It is preferable for the video acquiring section 140 to read a video including the game image at the time when the unlock condition becomes satisfied from the ring buffer 136. That is, the video acquiring section 140 reads out a video including a video that is before the timing when the unlock condition becomes satisfied and a video that is after the timing when the unlock condition becomes satisfied from the ring buffer 136. By including the videos that are before and after the timing when the unlock condition becomes satisfied, the video includes the game scene before the trophy is acquired and the game scene after the trophy is acquired.

It should be noted that it is preferable for the video acquiring section 140 to read out the video such that the image at the time when the unlock condition becomes satisfied is positioned earlier than the end position of the video by a predetermined time regardless of the length set by the setting section 142.

FIG. 5(*a*) illustrates a video for 30 seconds, and FIG. 5(*b*) illustrates a video for 15 seconds. As illustrated in the figure, the image when the unlock condition becomes satisfied is located at a position ahead of the end position of the video by a predetermined time t in each video. As a result, regardless of which video is reproduced, the video ends after the passage of a predetermined time t from the timing when the trophy is given, which gives a sense of unity to the videos of different lengths. For example, "t" may be approximately 3 seconds.

Whenever being notified by the trophy processing section 124 of unlock information indicating that the unlock condition is satisfied, the video acquiring section 140 reads a video including a game image when the unlock condition becomes satisfied from the ring buffer 136 and records the video in the second recording section 160. As a result, as many videos as the number of trophies acquired by the user are recorded in the second recording section 160 for one game title.

The video processing section 152 performs editing processing on the video recorded in the second recording section 160. After the game is finished, when the user selects the video recorded in the second recording section 160 for uploading to a video sharing site, for example, the video selecting section 150 accepts selection operations for the video recorded in the second recording section 160.

Figure 6:
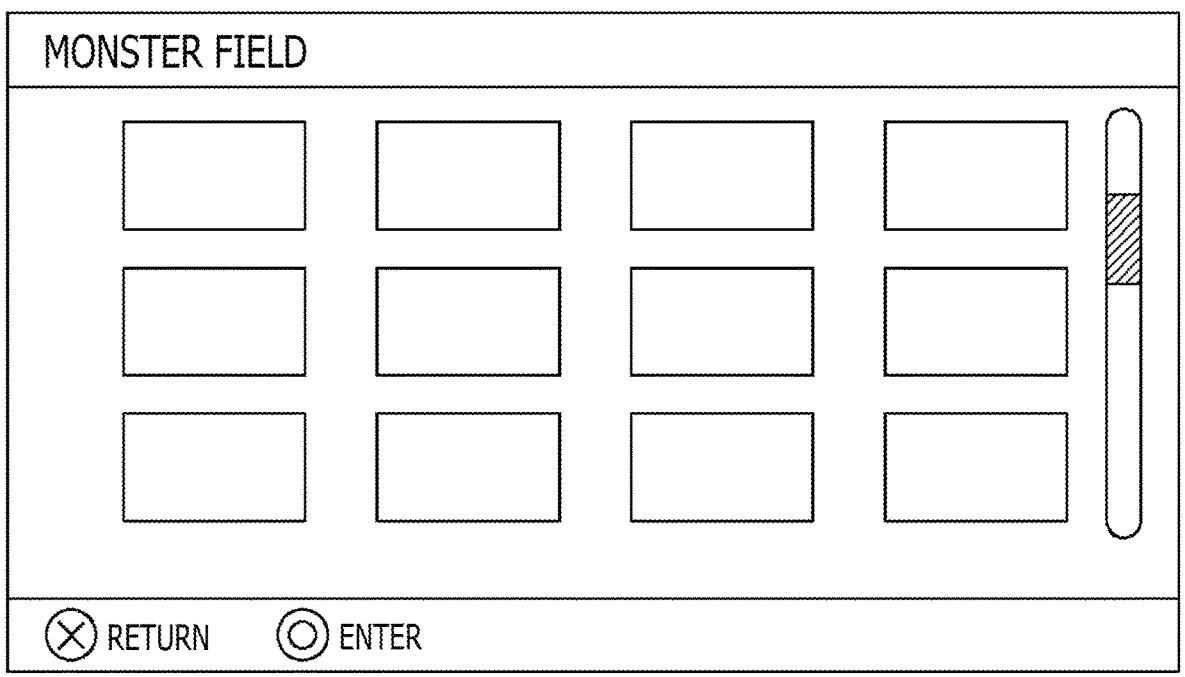
FIG. 6 is a diagram illustrating an example of a selection screen for the videos recorded in a second recording section.

FIG. 6 illustrates an example of the selection screen for a video recorded in the second recording section 160. On this selection screen, thumbnails of videos recorded for the game title "Monster Field" are displayed. The system software may display a selection screen for selecting a game title on the output device 4, and the user may select the "Monster Field" to display the selection screen illustrated in FIG. 6. When the user selects one thumbnail on the video selection screen, the video selecting section 150 accepts the selection operation for the video. As a result, the video processing section 152 executes editing processing on the selected video.

Figure 7:
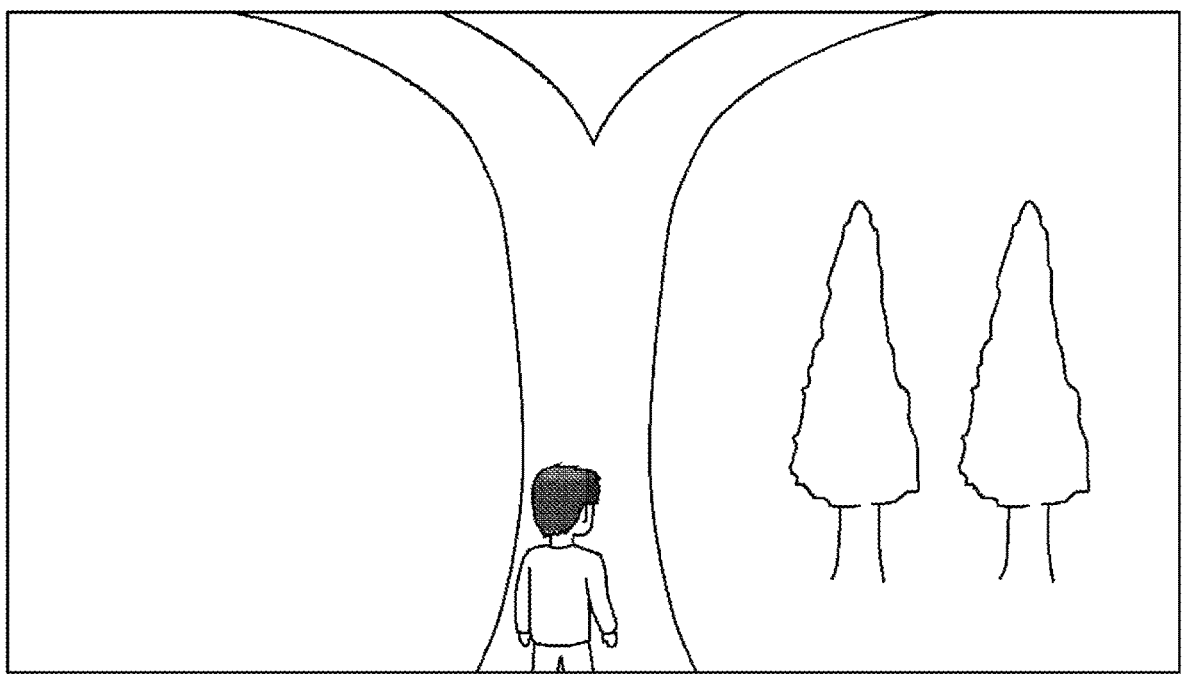
FIG. 7 depicts diagrams illustrating an example of a video recorded in the second recording section.
Figure 7:
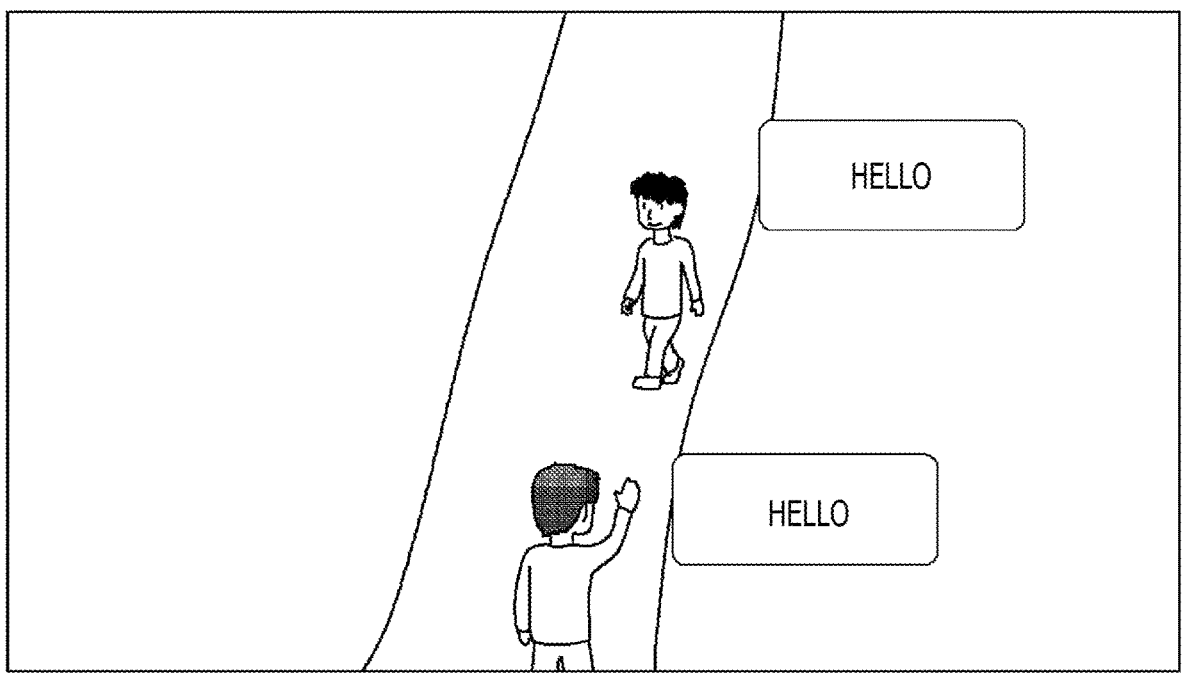

FIG. 7(*a*) illustrates an example of an image of the head of the video recorded in the second recording section 160. FIG. 7(*b*) illustrates an example of an image of the video when the unlock condition becomes satisfied recorded in the second recording section 160. Here, it is assumed that the unlock condition of the silver trophy of "greeting 100 villagers" is satisfied.

Figure 8:
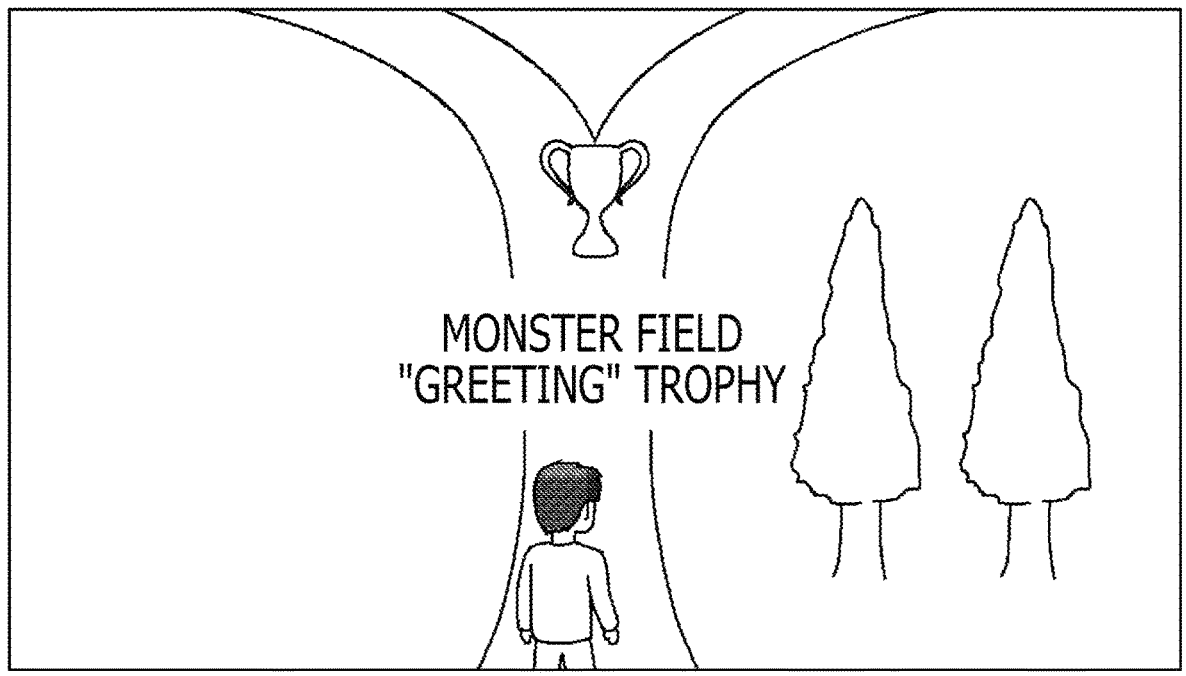
FIG. 8 depicts diagrams illustrating an example of editing the video.
Figure 8:
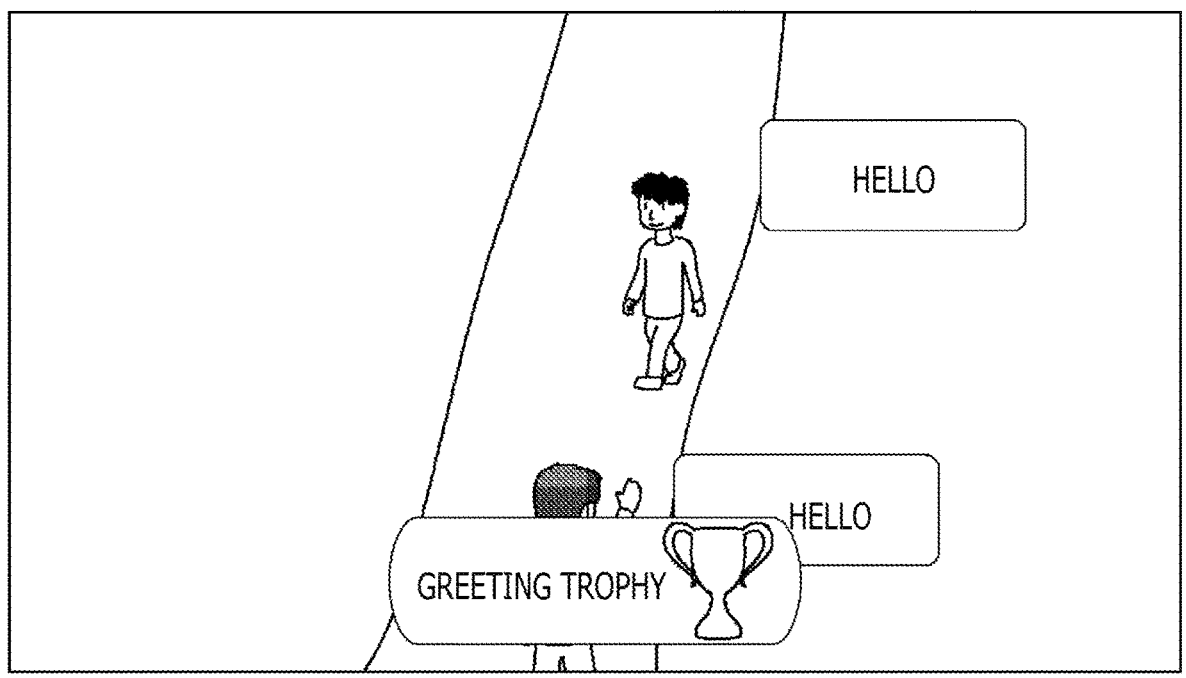

The video processing section 152 may include information related to the game title at the head of the video. FIG. 8(*a*) illustrates an editing example of the head of the video. The video processing section 152 uses the trophy metadata associated with the video to cause the video to include information regarding the game title, trophy name, and trophy grade at the head of the video. Information regarding the trophy grade may be represented by the color of the trophy image. In this example, the image of the trophy is represented in silver. These pieces of information are edited so as to be included in the head, so that the viewing user can recognize at least the information regarding the game title or the like at the beginning. Note that the head of the video refers to a range of a predetermined time from a position at or near the beginning of the video, and for example, the video processing section 152 may perform the editing process of superimposing at least the information regarding the game title in the video as an image for three seconds from the start position.

Further, the video processing section 152 may cause the video to include the information regarding the given trophy at a timing when the unlock condition becomes satisfied.

FIG. 8(*b*) illustrates an editing example at the timing when the unlocking condition of the video becomes satisfied. The video processing section 152 uses the trophy metadata associated with the video to cause these pieces of information regarding the trophy name and trophy grade to be included in an image that is at the timing when the unlock condition becomes satisfied in the video. The information regarding the trophy grade may be represented by the color of the trophy image. By editing these pieces of information so as to be included in the image that is at the timing when the unlock condition becomes satisfied, the viewing user can recognize the timing of the trophy acquisition, and the name and grade of the trophy. Note that the video processing section 152 may cause the information regarding the trophy to be included before and after the timing when the unlock condition becomes satisfied. For example, the video processing section 152 may perform an editing process of superimposing the information regarding the trophy on a video as an image in predetermined seconds (for example, 1.5 seconds) before and after the timing when the unlock condition becomes satisfied.

When editing the video, the video processing section 152 overwrites the video recorded in the second recording section 160 with the edited video. As a result, the trouble of repeatedly performing the same editing process can be omitted on the same video.

The present invention has been described above based on an embodiment. This embodiment is an example, and it is understood by those skilled in the art that various modifications are possible for combinations of these respective components and respective processing processes, and that such modifications are also within the scope of the present invention.

For example, when the user acquires a trophy, the game software 110 may be configured to reward a user for acquisition of the trophy. This makes it possible to further enhance the attractiveness of acquiring the trophy. At this time, the video acquiring section 140 may be notified of the information related to the reward as well as the unlock information, and the second recording section 160 may record the information related to the reward in association with the video. The information regarding the reward may be added to the video by the editing process by the video processing section 152.

Whenever being notified of the unlock information by the trophy processing section 124, the video acquiring section 140 reads a video including the game image when the unlock condition becomes satisfied from the ring buffer 136, and records the video in the second recording section 160. Therefore, it is assumed that the second recording section 160 records as many videos as the number of trophies acquired by the user for one game title, and thus, the capacity of the second recording section 160 is consumed. Therefore, the video acquiring section 140 may lower the resolution of the game video recorded in the ring buffer 136 and record the video in the second recording section 160.

It should be noted that the system software may delete the video recorded in the second recording section 160 for the purpose of securing the recording capacity of the second recording section 160. The deletion condition may be set by the user, for example, and a condition may be set as the deletion condition such that the number of videos falls within a predetermined number for one game title, for example. At this time, the system software may preferentially leave the acquired image of the high-grade trophy and preferentially delete that of the low-grade trophy.

INDUSTRIAL APPLICABILITY

The present invention can be used in the technical field of video editing.

REFERENCE SIGNS LIST

1: Information processing system
10: Information processing device
100: Processing unit
102: Communication unit
110: Game software
120: Event information acquiring section
122: Routing section
124: Trophy processing section
126: Memory
128: Transmission processing section
130: Output processing section
132: Recording control section
134: First recording section
136: Ring buffer
140: Video acquiring section
142: Setting section
150: Video selecting section
152: Video processing section
160: Second recording section

The invention claimed is:

1. An information processing device comprising:
first recording circuitry configured to record a game video provided by game software that is running, together with time information;
award processing circuitry configured to give a virtual award to a user who is playing a game when an unlock condition of the virtual award is satisfied;
video acquiring circuitry configured to read a video including a game image when the unlock condition becomes satisfied from the first recording circuitry and records the video from the first recording circuitry in a second recording circuitry; and
video processing circuitry configured to perform editing processing on the video recorded in the second recording circuitry,
wherein the first recording circuitry is a ring buffer and the first recording circuitry is different than the second recording circuitry.

2. The information processing device according to claim 1, further comprising:
video selecting circuitry that receives an operation to select the video recorded in the second recording circuitry,
wherein the video processing circuitry performs editing processing on the selected video.

3. The information processing device according to claim 1, wherein
the video acquiring circuitry records the read video in the second recording circuitry in association with metadata of the virtual award.

4. The information processing device according to claim 1, wherein
the video processing circuitry causes information related to the given virtual award to be included in the video at a timing when the unlock condition becomes satisfied.

5. The information processing device according to claim 1, wherein
the video processing circuitry causes information related to a game title to be included in a head of the video.

6. The information processing device according to claim 1, wherein
the video processing circuitry overwrites the video recorded in the second recording circuitry with a video subjected to the editing processing.

7. The information processing device according to claim 1, wherein
the video acquiring circuitry reads the video including the game image when the unlock condition becomes satisfied in a middle thereof from the first recording circuitry.

8. The information processing device according to claim 7, further comprising:

setting circuitry that sets a length of the video to be read by the video acquiring circuitry, wherein the video acquiring circuitry reads the video such that the image when the unlock condition becomes satisfied is located at a time earlier than an end position of the video by a predetermined time regardless of the set length.

9. A video editing method comprising:

recording, by first record circuitry, a game video provided by game software that is running in the first recording circuitry together with time information;

giving a virtual award to a user who is playing a game when an unlock condition of the virtual award is satisfied;

recording, in second recording circuitry, a video including a game image when the unlock condition becomes satisfied by reading the video from the first recording circuitry; and performing editing processing on the video recorded in the second recording circuitry, wherein the first recording circuitry is a ring buffer and the first recording circuitry is different than the second recording circuitry.

10. A non-transitory computer-readable storage medium storing computer-readable instructions thereon which, when executed by a computer, cause the computer to perform a method, the method comprising:

by first recording circuitry, recording a game video provided by game software that is running in the first recording circuitry together with time information;

by award processing circuitry, giving a virtual award to a user who is playing a game when an unlock condition of the virtual award is satisfied;

by video acquiring circuitry, recording a video including a game image when the unlock condition becomes satisfied in second recording circuitry by reading the video from the first recording circuitry; and by video processing circuitry, performing editing processing on the video recorded in the second recording circuitry, wherein the first recording circuitry is a ring buffer and the first recording circuitry is different than the second recording circuitry.

* * * * *